Patented Feb. 26, 1952

2,587,468

UNITED STATES PATENT OFFICE 2,587,468

ETHYLENE OXIDE PROCESS

Rudolph L. Heider, Dayton, Ohio, assignor to Monsanto Chemical Company, St. Louis, Mo., a corporation of Delaware No Drawing. Application March 27, 1948,
Serial No. 17,590

10 Claims. (Cl. 260—348.5)

The present invention is concerned with an improvement in the production of ethylene oxide by the catalytic oxidation of ethylene.

It is an object of the invention to make it possible to operate a catalytic process for the production of ethylene oxide at a high temperature and with rich gas mixtures without the danger of initiating the complete combustion of the gas stream. It is also an object to improve the conventional processes to achieve high conversions to ethylene oxide. Still another object is to control the extent of reaction and to suppress undesired side reactions in the processing of ethylene with oxygen or oxygen-containing gases such as air.

The catalytic oxidation of ethylene with oxygen-containing gases has been shown to be possible in the presence of silver as a catalytic material supported upon various carriers. In many cases it has been shown that coaction of silver with the carrier may influence the oxidation reaction. Therefore, it is important that the carrier itself should not be too active, and it is also important to obtain a finely divided coating of silver upon the carrier.

Because of the concurrent reactions which are inevitable in ethylene oxidation, it is essential that the catalytic reaction to obtain ethylene oxide be promoted and that the side reactions, particularly those of complete combustion of ethylene, or of already formed ethylene oxide to carbon dioxide and water should be reduced to as low a degree as is possible. For example, in the utilization of silica gel with silver as the catalytic material, it is found that the activity of this catalyst combination results in the practically complete combustion of the ethylene feed so that there is no appreciable ethylene oxide formed. Other catalysts having high oxidative activity have also been found to give only low yields of ethylene oxide.

It has now been discovered that the extent of oxidation and a selective control of the several reactions is possible by the admixture of certain phosphorus compounds with the feed gases entering the catalytic system. As a preferred embodiment, particular organic phosphates may be added to the entering gases as a fluid stream, in which case the phosphates are vaporized and carried together with the ethylene and other hydrocarbons plus oxygen to the catalyst. It is also possible to introduce the phosphorous-containing compounds into the reaction system by bubbling all or part of the reactant gases through a liquid body existing as a spray or pool of the said phosphates, whereby a controlled amount of such compounds is added to the reactants. Direct injection of these compounds into the reaction system or their introduction as a spray mist may also be practiced.

The compounds contemplated in the present invention include elemental phosphorus, phosphorus oxides and other compounds, particularly the phosphorous-containing acids and their organic-substituted esters in which the substituents comprise hydrocarbon radicals having from 1 to 8 carbon atoms. As representatives of the completely oxidized phosphorus acids, typical compounds are: ortho-phosphoric acid, $H_3PO_4$; pyro-phosphoric acid, $H_4P_2O_7$; meta-phosphoric acid, $(HPO_3)x$; tri-phosphoric acid, $H_5P_3O_{10}$. Other phosphorus-containing acids in the same relationship which function either by their existence as the acid or by a break-down at the operating temperature of about 200-300° to yield completely oxidized acids are phosphorus acid, $H_3PO_3$; pyrophosphorous acid, $H_4P_2O_5$; meta-phosphorus acid, $HPO_2$; hypophosphorous acid, $H_3PO_2$; and hypophosphoric acid, $H_4P_2O_6$. Phosphine, $PH_3$, is also included, since it rearranges to give phosphorus oxides and acids in the reaction system of the present invention. The phosphonic and phosphinic acids substituted as described above are likewise contemplated.

The organic substitutents present as radicals with the phosphorus-containing acids may be either alkyl, aryl, or mixtures of the same, and may be present as substituents for any of the replaceable hydrogen atoms present in the molecule. Thus, in the preferred embodiment of the phosphoric acid the type of compounds may be represented by the structural formula shown below:

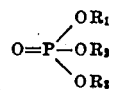

where $R_1$, $R_2$ and $R_3$ are hydrogen, alkyl, alkyl-aryl, aryl-alkyl, aryl or cycloalkyl radicals having from 1 to 8 carbon atoms. However, phosphoric acid and the phosphorous-containing compounds which yield phosphoric acid and other phosphorus-oxygen-containing acids are also contemplated by the present invention. Obviously, the substituents attached to the phosphorus atom may be unlike radicals.

Specific compounds which constitute preferred embodiments of the present invention include trimethyl, triethyl and triisopropyl phosphates, and as representatives of the aryl substituents, the triphenyl and tricresyl phosphates are preferred.

In the operation of an ethylene oxide process utilizing the above organic phosphorus-containing inhibitors as selective controlling agents, there are certain physically recognizable effects which may be operative and controlling in the selectivity and nature of the various competing reactions. Because the essential constituent of the active catalyst is thought to be silver, existing either as metallic silver, as silver oxide or as mixtures of these two constituents, the phosphorus compounds may be present merely as loose surface coatings upon the metallic surface. In view of the extensive surface of the silver deposited by impregnation or other means upon the carrier, it may be that there is only a physical adsorption of the phosphorus compound upon the silver. Another hypothesis which has been advanced in the exploration of the present phenomena is the presence of loosely bonded compounds which would be in the nature of silver phosphates. Such phosphates might be formed during the addition of the organic phosphates to the reaction system. However, such loose silver phosphorus compounds, probably would be very unstable at the reaction temperatures of approximately 225° C. to 350° C., although the activating influence of such phosphates might promote the ethylene oxide reaction by providing nuclei or active centers at which the ethylene and the oxygen may be momentarily adsorbed for reaction to provide the desired ethylene oxide.

The phenomenon of chemisorption may also be the underlying basis for the successful use of these phosphorus compounds such as the alkyl and aryl phosphates in the selective action upon the oxidation reactions. Another type of reaction which may take place in the oxidation of ethylene in the presence of the compounds of the invention as promoters, is the formation of chelate compounds which, although transitory in nature, might be of importance in providing the locale for the joining of ethylene molecules and oxygen molecules with the proper local conditions and kinetics to influence the direction of the reaction. However, the applicant does not choose to be bound by any theory regardless of its seeming validity in setting forth a mechanism explaining the nature of the present invention.

An advantage of the phosphorus-containing compounds of the invention in controlling the oxidation of ethylene is the fact that the inhibitive effect is not permanent, so that there is not present a true poisoning effect. In contrast to sulfur compounds such as hydrogen sulfide, for example, which react with silver, as exemplified in the tarnishing of household silverware to give an irreversible product, the present phosphorus compounds operate only over a transitory period. Thus, the intermediate silver phosphate or other adsorbed phosphate effect operates only for a limited time in controlling the silver surface. Therefore, it is desirable in carrying out the continuous production of ethylene oxide by the present invention that a small amount of the phosphate be added periodically or as a minute, continuous stream. Various chemical feeding devices are available, for example, for proportioning the phosphate feed as a fixed ratio with respect to the ethylene and oxygen-containing gases fed to the reactor system.

In some processes for obtaining ethylene oxide from impure ethylene sources, difficulties occur because of hot spots. For example, when small concentrations of acetylene are present in the ethylene gas feed, it is often noticed that the acetylene burns with the oxygen to form free carbon, which may be deposited upon the catalyst surfaces. This carbon may be burned off by the incoming oxygen, but such combustion may be the cause of localized overheating or hot spots reaching a sufficiently high temperature locally to fuse the silver coating upon the carrier. Such fusion results in the complete break-down of the active silver surface and also results in a loss of the surface area of the deposited silver film. Consequently, such overheating of the catalyst renders it worthless for subsequent processing. However, the use of the organic alkyl and aryl phosphates of the present invention mitigates the effects of hot spots and allows the catalytic reaction to be carried on more smoothly without the danger of runaway reactions concomitant with the production of large amounts of heat resulting from the complete combustion of the hydrocarbons and ethylene oxide to water and carbon dioxide. The adsorbed phosphates which are in combination with the silver coating on the carrier controls the extent of oxidation and even in such extreme circumstances as outlined above, permits ethylene oxide production to be maintained in spite of the use of impure ethylene. It should be understood, however, that the invention may be employed when operating with pure as well as impure ethylene.

The examples below are intended as a further detailed explanation of the operation of an ethylene oxide process utilizing the present improvement comprising the addition of phosphorus-containing compounds, and is not intended as limitative upon the scope of the invention.

*Example 1*

An ethylene oxide process was carried out employing a typical alumina base catalyst of the prior art. The catalyst was obtained by impregnating tubular alumina with silver nitrate, drying this catalyst and then reducing it in the reactor to obtain a finished catalyst containing approximately 10% silver by weight. A stainless steel tube was employed as the reactor, and a temperature control system was provided by means of a salt bath surrounding the catalyst tube. The depth of the catalyst bed in the reactor tube was 12 inches and the incoming gas stream comprising 3% ethylene and 97% air was passed through the catalyst at a space velocity of 667 R. H. By the term "space velocity" expressed as reciprocal hours (R. H.) I mean the number of volumes of gas measured at standard conditions (0° C./760 mm.) per hour passing over a unit volume of catalyst.

It was found that the above catalyst when operated with a bath temperature of about 280° C. and an internal catalytic bed temperature of about 310° C. reached a uniform conversion level of 29.5% and operated at 34.5% yield of ethylene oxide. By conversion I mean moles of ethylene oxide formed per mole of fresh ethylene charged and by yield, the moles of ethylene oxide formed per mole of ethylene consumed.

*Example 2*

The catalyst of Example 1 under the same operating conditions was subjected to the organic phosphate control method of the present invention. In this example, triethyl phosphate was kept in a thermostated vessel, through which the incoming ethylene stream was passed. It was found that when the phosphate bath was held at approximately 0° C., 432 parts per million (p. p. m.) on a volume basis of triethyl phosphate was added to the total gas stream of ethylene and air.

It was observed in conducting this test that the temperature profile within the catalytic bed approached a more uniform value and that there was a decreased tendency to form hot spots in the catalytic bed. The single pass conversion in this case amounted to 33.2% and the yield was 42.6% of ethylene oxide.

Example 3

Another test was conducted utilizing triethyl phosphate as the reaction controlling means over the same catalyst as that of Example 1. In this instance 2160 parts per million by volume of triethyl phosphate was added to the reactant stream. The conversion of ethylene amounted to 36.4% and the yield was 49.5% of ethylene oxide.

Example 4

In the continuation of the tests made with the same catalyst and under the same conditions as in Example 1, the phosphate feed was cut off. It was found that the catalyst, after approximately 30 hours of operation, reverted to its original condition, showing that the phosphate addition had not permanently poisoned the catalyst. Apparently the nature of the bonding or adherence of the phosphates to the active catalytic surface is such that the moderating effect of the phosphate tends to act only upon controlled proportions of the catalytic surface and that this effect is a reversible phenomenon. It was found that the catalyst under the conditions of the previous examples showed an ethylene conversion amounting to 29.5% and that the yield of ethylene oxide was 34.7%.

Example 5

The use of other phosphates of the present invention was shown by carrying out ethylene oxide production employing a silver catalyst in combination with a silica-alumina carrier. In this case the alumina was present to the extent of 10% in the carrier mixture, together with silica as 4-8 mesh particle. Silver had been added to this carrier by a slurrying method, employing silver oxide which was then reduced in the catalytic converter to achieve a final silver concentration amounting to approximately 10% calculated as metallic silver.

The moderating means in this instance was tricresyl phosphate, which was added intermittently during the conduct of the test. It was found that the conversion amounted to approximately 48% of the ethylene charged and that the yield of ethylene oxide was 66%.

Example 6

The use of phosphine as a controlling chemical in the ethylene oxide reaction was tested with a catalyst identical to that of Example 5. This silica-alumina catalyst containing approximately 10% by weight of metallic silver was employed as a 100 cc. charge in a stainless steel converter provided with a constant temperature jacket. The gas feed consisted of 3% ethylene and 97% air, together with very small amounts of phosphine. The reactants entering the catalytic zone were 1.5 liters per hour of ethylene and 48.5 liters per hour of air.

The phosphine employed to control the reaction was generated in a separate vessel by adding a controlled stream of water to solid calcium phosphide. The phosphine which was thereby generated was swept into the reactor by passing the ethylene feed stream through the phosphine generator, thereby avoiding contact with air until the reactor itself was reached. By means of independent entering lines, the ethylene and the air were kept from mixing until they reached the reactor proper. The phosphine was admitted as an extremely small component present only in quantities sufficient to indicate a moderating effect upon the oxidation to yield ethylene oxide.

As the result of further investigation it appears that the selective action of phosphorus-containing compounds results from the use of controlled amounts in the range of 10 to 100,000 parts per million (p. p. m.) on a volume basis of said compounds either by continuous or intermittent addition to one or more of the reactants entering the catalytic converter. A preferred embodiment is the use of 400 to 50,000 p. p. m. in the same relationship. Steam or carbon dioxide addition may also be carried on in connection with the use of the phosphorus-containing compounds as contemplated in the present invention.

To summarize the invention, it has been found that phosphorus-containing compounds, and in particular the organic phosphates having from 1 to 8 carbon atoms in the hydrocarbon radical are effective in controlling the extent of the competing reactions in ethylene oxide production. Mono-, di- and tri-substituted phosphates having the same or different substituents in the molecule are contemplated by this invention.

Various changes in the method of applying the above process to ethylene oxide production are contemplated and such procedures are considered to be a part of the present invention without departing from the invention or sacrificing any of its advantages.

What I claim is:

1. In the production of ethylene oxide by the catalytic oxidation of ethylene with oxygen-containing gases reacting in contact with silver surfaces, the improvement which comprises feeding from 10 to 100,000 parts per million on a volume basis of tri-substituted organic phosphates to the said reaction, said substituents of which contain from 1 to 8 carbon atoms.

2. In the catalytic oxidation of ethylene with an oxygen-containing gas to obtain ethylene oxide over a silver surface, the improvement which comprises feeding from 10 to 100,000 parts per million on a volume basis of triethyl phosphate to the reaction mixture.

3. In the catalytic oxidation of ethylene with an oxygen-containing gas to obtain ethylene oxide over a silver surface, the improvement which comprises feeding from 10 to 100,000 parts per million on a volume basis of tricresyl phosphate to the reaction mixture.

4. In the catalytic oxidation of ethylene with an oxygen-containing gas to obtain ethylene oxide over a silver surface, the improvement which comprises feeding from 10 to 100,000 parts per million on a volume basis of triphenyl phosphate to the reaction mixture.

5. In the catalytic oxidation of ethylene with an oxygen-containing gas to obtain ethylene oxide over silver surfaces, the improvement which comprises adding to the gas stream from 400 to 50,000 parts per million on a volume basis a tri-ester of phosphoric acid in which each ester group contains from 1 to 8 carbon atoms in each substituent radical.

6. In the catalytic oxidation of ethylene with an oxygen-containing gas to obtain ethylene oxide over a silver surface over which a reactant stream including said ethylene is passed, the improvement which comprises feeding to the said reactant stream from 400 to 50,000 parts per million on a volume basis of a phosphorus-containing ester having the ester groups comprising hydrocarbon radicals having from 1 to 8 carbon atoms in each substituent radical.

7. In the production of ethylene oxide by the catalytic oxidation of ethylene with oxygen-containing gases as the reactant stream in contact with silver surfaces, the improvement which comprises feeding from 10 to 100,000 parts per million on a volume basis of organic phosphates to said reactant stream.

8. In the catalytic oxidation of ethylene with an oxygen-containing gas to obtain ethylene oxide over a silver surface, over which a reactant stream including said ethylene is passed, the improvement which comprises feeding an organic ester of phosphorus compound to the said reactant stream in the amount of 10 to 100,000 parts per million on a volume basis.

9. In the catalytic oxidation of ethylene with an oxygen-containing gas to obtain ethylene oxide over a silver surface, over which a reactant stream including said ethylene is passed, the improvement which comprises feeding 10 to 100,000 parts per million by volume of the said reactant stream, of a phosphorus-containing ester having the ester groups comprising hydrocarbon radicals having from 1 to 8 carbon atoms.

10. In the catalytic oxidation of ethylene with an oxygen-containing gas to obtain ethylene oxide over a silver surface over which a reactant stream including said ethylene is passed, the improvement which comprises feeding from 400 to 50,000 parts per million on a volume basis of an organic ester of phosphorus to the said reactant stream.

RUDOLPH L. HEIDER.

REFERENCES CITED

The following references are of record in the file of this patent:

UNITED STATES PATENTS

| Number | Name | Date |
|---|---|---|
| 2,366,725 | Gardner | Jan. 9, 1945 |

FOREIGN PATENTS

| Number | Country | Date |
|---|---|---|
| 444,186 | Great Britain | Mar. 13, 1936 |